United States Patent [19]

Akagi et al.

[11] 4,436,070

[45] Mar. 13, 1984

[54] APPARATUS FOR CONTROLLING THE PROPORTION OF AIR AND FUEL IN AN AIR-FUEL MIXTURE OF THE INTERNAL COMBUSTION ENGINE

[75] Inventors: Motonobu Akagi; Isshi Nomura, both of Aichi; Kyo Hattori; Kichiro Kato, both of Shizuoka, all of Japan

[73] Assignees: Aisin Seiki Kabushiki Kaisha, Kariya; Toyota Jidosha Kabushiki Kaisha, Toyota, both of Japan

[21] Appl. No.: 390,889

[22] Filed: Jun. 22, 1982

[30] Foreign Application Priority Data

Jun. 23, 1981 [JP] Japan .................. 56-097041

[51] Int. Cl.³ ............................................ F02M 7/24
[52] U.S. Cl. .................................... 123/440; 123/589
[58] Field of Search ............... 123/438, 440, 585, 589

[56] References Cited

U.S. PATENT DOCUMENTS

| | | | |
|---|---|---|---|
| 4,105,726 | 8/1978 | Lindberg | 123/440 X |
| 4,132,199 | 1/1979 | Kuroiwa | 123/440 |
| 4,287,864 | 9/1981 | Takada et al. | 123/440 |
| 4,303,048 | 12/1981 | Nishio | 123/438 X |
| 4,314,536 | 2/1982 | Tipton | 123/440 |

*Primary Examiner*—Tony M. Argenbright
*Attorney, Agent, or Firm*—Oblon, Fisher, Spivak, McClelland & Maier

[57] ABSTRACT

An apparatus for controlling the proportion of air and fuel in the air-fuel mixture of the internal combustion engine includes a carburetor having a main system fuel tube, a main system air-bleeding passage, a slow system fuel tube and a slow system air-bleeding passage, and a proportional control solenoid valve including an air-inlet port, a first outlet port communicating with the main system air-bleeding passage, a second outlet port communicating with the slow system air-bleeding passage and a moving-coil linear motor incorporated therein, wherein the proportional control solenoid valve is adapted to supply air to the main system air-bleeding passage and the slow system air-bleeding passage at a flow rate proportional to the level of the intensity of an electric current supplied to the moving-coil linear motor when the intensity of the electric current lies within a range between two predetermined values Imin and Imax.

3 Claims, 3 Drawing Figures

APPARATUS FOR CONTROLLING THE PROPORTION OF AIR AND FUEL IN AN AIR-FUEL MIXTURE OF THE INTERNAL COMBUSTION ENGINE

BACKGROUND OF THE INVENTION

1. Field of the Invention

The present invention relates to an apparatus to control the ratio of air to fuel of the air-fuel mixture which is supplied to an internal combustion engine, and more particularly to an apparatus provided for controlling the amount of air supplied to the main system fuel passage and the slow system fuel passage of a carburetor for supplying an air-fuel mixture to an internal combustion engine by means of a single proportional control solenoid valve.

2. Description of the Prior Art

It is known to incorporate a catalytic converter have ternary catalytically active substances into the exhaust system of the internal combustion engine of an automobile in order to simultaneously reduce the injurious components of the exhaust gas, such as hydrocarbons (HC), carbon monoxide (CO) and nitrogen oxides (NOx). It is required to supply an air-fuel mixture of an air-fuel ratio corresponding to the stoichiometric air-fuel ratio into the cylinders of an internal combustion engine, since the maximum cleaning efficiency of the ternary catalytically active substances is attained when the exhaust gas is produced by the combustion of an air-fuel mixture of the stoichiometric air-fuel ratio. An air-fuel ratio controller to meet such a requirement is proposed, which includes a main system air-bleeding passage connected to the main system fuel passage connecting to the main jet of a carburetor, a slow system air-bleeding passage connected to the slow system fuel passage connecting to the slow system fuel supply port of the carburetor, and a main system proportional control solenoid valve for controlling the main air bleeder and a slow system proportional control solenoid valve for controlling the slow air bleeder, which are disposed within the main system air-bleeding passage and the slow system air-bleeding passage, respectively, and are adapted to be controlled by a control signal provided by converting the output signal of an oxygen sensor disposed within the exhaust passage of the engine by means of an electronic control unit. It is proposed to control the rate of air to be supplied to the main system fuel passage and to the slow system fuel passage through the main system air-bleeding passage and through the slow system air-bleeding passage, respectively, with an air-fuel ratio controller as described above, so that the air-fuel ratio of the air-fuel mixture which is supplied into the cylinders of an engine is controlled so as to be close to the stoichiometric air-fuel ratio.

However, heretofore known air-fuel ratio controllers of this type for carburetor are provided with individual proportional control solenoid valves in the main system air-bleeding passage and the slow system air-bleeding passage, respectively, and are adapted to control both proportional control solenoid valves simultaneously with the control signal of a single system provided by the control signal producing circuit of an electronic control unit. Accordingly, the electronic control unit is required to supply an electric current simultaneously to the main system and the slow system proportional control solenoid valves. Therefore, the electronic control unit is necessary to be capable of supplying an electric current twice as much as that to be supplied to a single solenoid. Thus such conventional air-fuel ratio controllers have a disadvantage that the control signal producing circuit of the electronic control unit must consist of elements which have superior current capacities.

SUMMARY OF THE INVENTION

The primary object of the present invention is to provide an apparatus capable of controlling the amount of air which is supplied to the main system fuel passage and the slow system fuel passage of a carburetor for supplying an air-fuel mixture to an internal combustion engine with a single proportional control solenoid valve.

According to the present invention, there is provided an apparatus for controlling the proportion of air and fuel in the air-fuel mixture of the internal combustion engines, including in combination: a carburetor, a proportional control solenoid valve and control means for controlling the solenoid valve. The carburetor includes an air horn tube having a venturi tube and a throttle valve and being connected to the intake manifold of an internal combustion engine, a main system fuel tube opening into the main nozzle of the venturi tube at one end thereof and communicating with a main system fuel passage through the other end thereof, a slow system fuel tube opening into a slow system fuel supply port which is adjacent to the throttle valve of the air horn tube at one end thereof and communicating with a slow system fuel passage through the other end thereof. The proportional control solenoid valve includes a box-shaped housing formed of a magnetic material and provided with an air-inlet port, a first outlet port connected to the main system air-bleeding passage and a second outlet port connected to the slow system air-bleeding passage, a single iron core having a tubular periphery, supported by the housing at opposite ends thereof and provided with separately formed first and second passages communicating with the first outlet port and the second outlet port, respectively, at the opposite end thereof, first valve openings formed in the shape of an oblong circle extending axially of the iron core in the portion of the iron core provided with the first passage and adapted to allow communication of the first passage with the air-inlet port, and second valve openings formed in the shape of an oblong circle extending axially of the iron core in the portion of the iron core provided with the second passage and adapted to allow communication of the second outlet port with the air-inlet port, single bobbin axially slidably mounted on the periphery of the iron core, provided with a solenoid wound around the periphery in an axial portion thereof and having a first valve element and a second valve element for opening and closing the first valve openings and the second valve openings, spring means urging the bobbin in one axial direction of the iron core and at least one pair of permanent magnets fixed to the housing at a position corresponding to the solenoid and so disposed that the flux of the magnetic force thereof is passing perpendicular to the solenoid. The control means is provided for supplying analog electric signals to the solenoid of the proportional control solenoid valve, whereby the bobbin of the proportional control solenoid valve moves axially along the iron core by a distance proportional to the level of the analog electric signal applied to the solenoid by the control means and the first valve element and the second valve element each formed in the bobbin open the first valve openings and the second valve openings, respectively, by the respective areas corresponding to the level of the analog electric signals applied to the solenoid.

BRIEF DESCRIPTION OF THE DRAWINGS

Various other objects, features and attendant advantages of the present invention will be more fully appreciated as the same becomes better understood from the following detailed description when considered in connection with the accompanying drawings wherein.

DETAILED DESCRIPTION OF THE PREFERRED EMBODIMENT

Figure 3:
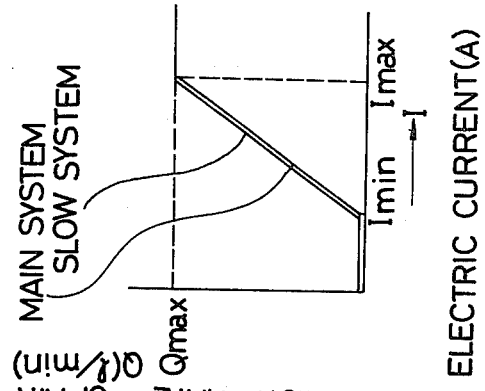
FIG. 3 is a diagram illustrating the control characteristic of the proportional control solenoid valve shown in FIG. 2 in terms of the relationship between the flow rate of air and the electric current.
Figure 1:
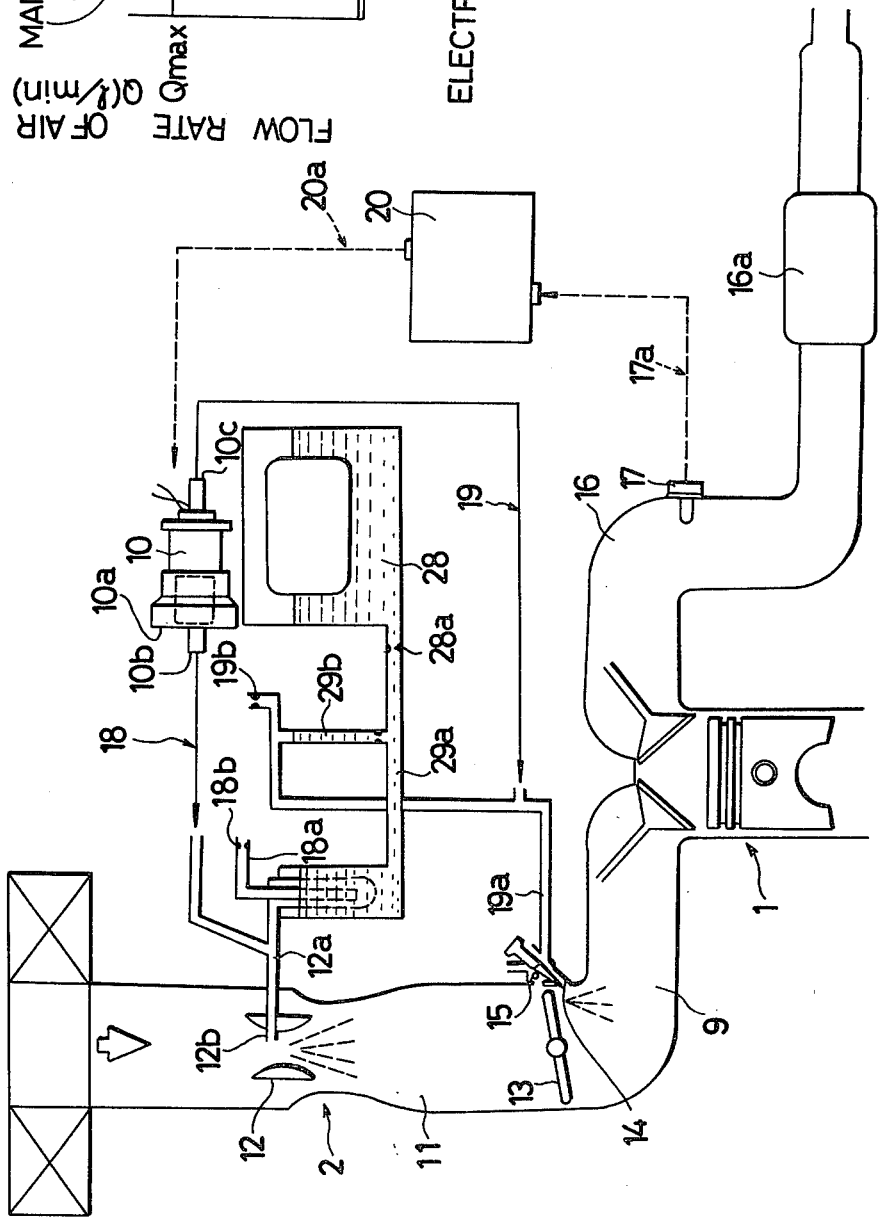
FIG. 1 is a diagrammatic view illustrating the general constitution of an embodiment in accordance with the present invention.

Referring to the accompanying drawings, and first to FIG. 1, indicated by reference numeral 1 is an internal combustion engine and by reference 2 is a carburetor. The carburetor 2 is mounted on the intake manifold 9 of the engine 1 by joining the air horn tube 11 thereof to the intake manifold 9. A catalytic converter 16a having ternary catalytic active substances is attached to the exhaust manifold 16.

The carburetor is provided, within the air horn tube 11, with a venturi tube 12 and a throttle valve 13 and is connected to the intake manifold 20 of the engine at the downstream end of the air horn tube 11 and receives an air cleaner on the upstream end of the air horn tube 11.

A main nozzle 12b formed at one end of a main system fuel tube 12a is opening into the venturi tube 12. The main system fuel tube 12a is connected to a float chamber 28 through a main system fuel passage 29a and a main system adjusting jet 28a. An air-bleeding tube 18a is disposed within the main system fuel passage 29a and is opened into the atmosphere through a fixed jet 18b. The main system fuel tube 12a is connected to the first outlet port 10b of a proportional control solenoid valve 10 through a main air-bleeding passage 18. A slow system fuel passage 29b is branched from the main system fuel passage 29a. The slow system fuel passage 29b is connected, through a slow system fuel tube 19a, to a slow system fuel supply port including an idling fuel jet 14 and a slow fuel port 15 which are opened into the air horn tube 11 in the vicinity of the throttle valve 13. Further, the slow system fuel passage 29b is opened into the atmosphere through a fixed jet 19b and is connected to the air-inlet port 10a of the proportional control solenoid valve 10 through the slow system air-bleeding passage 19.

An oxygen sensor 17 is attached to the exhaust manifold 16 of the internal combustion engine 1 and the output signal 17a of the oxygen sensor 17 is applied to an electronic control unit 20. The proportional control solenoid valve 10 is controlled by control signals provided by the electronic control unit 20.

The description of the proportional control solenoid valve 10 will be provided hereinafter with reference to FIG. 2. The proportional control solenoid valve 10 comprises a box-shaped housing formed by coaxially, sequentially, hermetically and fixedly joining a stepped cylindrical end portion 21 formed of a magnetic material and having the first outlet port 10b communicating with the main system air-bleeding passage 18, a stepped cylindrical yoke 25 formed of a magnetic material and having a plurality of through holes 25a and 25b which are formed in the peripheral wall thereof and a disc-shaped end cover 23 having the second outlet port 10c communicating with the slow system air-bleeding passage 19, and a moving-coil linear motor 30 disposed within the yoke 25 of the housing.

A filter cover 22 forming an annular air-inlet port 10a along the outer surface thereof and holding a filter 24 therein is hermetically fixed to the yoke 25 so as to allow communication of the inside space of the housing with the air-inlet port 10a through the through holes 25a and 25b formed in the yoke 25 and through the filter 24.

Figure 2:
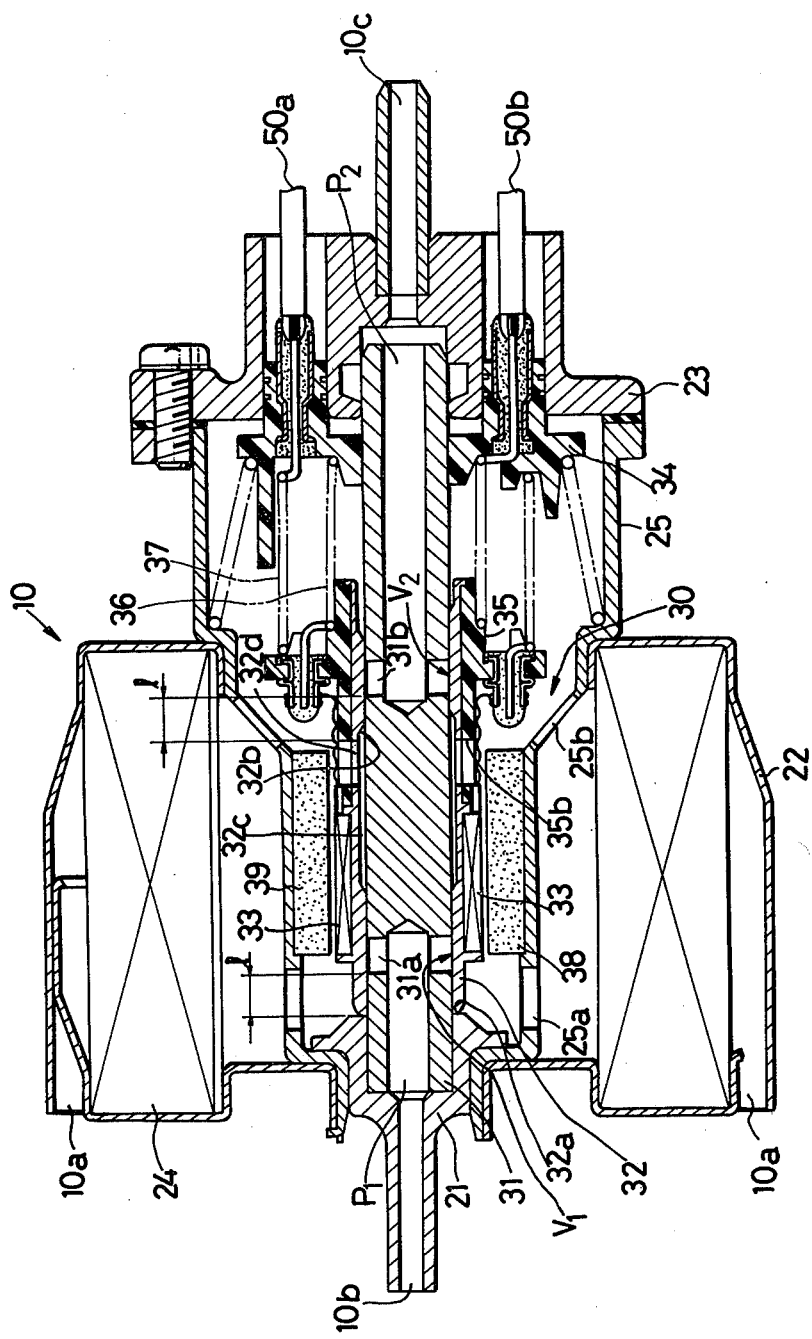
FIG. 2 is a sectional view of the proportional control solenoid valve shown in FIG. 1.

The moving-coil linear motor 30 comprises an iron core 31 which is hermetically held between the end portion 21 and the end cover 23 and is provided with a first passage $P_1$ communicating with the first outlet port 10b at the left end and a second passage $P_2$ communicating with the second outlet port 10c at the right end as shown in FIG. 2, which are formed separately, a bobbin 32 axially slidably mounted on the iron core 31 in the left portion thereof, a solenoid 33 wound on the bobbin 32, a spring holder 34 fitted on the iron core 31 in the right portion thereof and adapted for positional adjustment, a pair of conductive compression springs 36 and 37 interposed between the spring holder 34 and a nonconductive spring holder 35 fitted on the right-hand extension of the bobbin 32, and a pair of permanent magnets 38 and 39 fixed to the yoke 25 so provided that the flux of the magnetic force thereof is passing substantially perpendicular with respect to the winding of the solenoid 33. The respective left ends of the compression coil springs 36 and 37 are connected to the corresponding terminals of the winding of the solenoid 33, while the respective right ends are connected to lead wires 50a and 50b, respectively. The compression coil springs 36 and 37 are electrically insulated from the spring holder 34. Thus the axial sliding movement of the bobbin 32 of the linear motor 30 is controlled proportionally to the intensity of the current which is supplied to the solenoid 33 through the lead wires 50a and 50b and the compression coil springs 36 and 37.

A plurality of first valve openings 31a formed in an oblong circle extending axially of the iron core 31 are formed at equal circumferential intervals in the iron core 31 in the portion thereof provided with the first passage $P_1$. A first valve element 32a is formed on the inner circumference of the left end portion of the bobbin 32. A first control valve $V_1$ including the first valve openings 31a and the first valve element 32a is formed between the iron core 31 and the bobbin 32. While no electric current is supplied to the solenoid 33, the first control valve $V_1$ closes the first valve openings 31a and the first valve element 32a is positioned a distance 1 to the left from the left end of the first valve openings 31a. A plurality of second valve openings 31b each of the shape of an oblong circle extending axially of the iron core 31 are formed at equal circumferential intervals in the right-hand portion of the iron core 31 provided with the second passage $P_2$. An annular recess 32c communicating with through holes 32d formed at appropriate intervals are formed in the inner circumference of the right-hand portion of the bobbin 32. A stepped second valve element 32b is formed at the right end of the annular recess 32c. A second control valve $V_2$ including the second valve openings 31b and the second valve element 32b is formed between the iron core 31 and the bobbin 32. While no electric current is supplied to the solenoid 33, the second control valve $V_2$ closes the second valve openings 31b and the second valve element 32b is positioned a distance l to the left from the left end of the second valve openings 31b. When an electric current is supplied to the solenoid 33 of the linear motor 30, the bobbin 32 is caused to move rightward against the resilient force of the compression coil springs 36 and 37 When the bobbin 32 is moved from the left extreme position by a distance l, the first valve element 32a and the second valve element 32b of the first control valve $V_1$ and the second control valve $V_2$ start opening the first valve openings 31a and the second valve openings 31b, respectively (the distance l will be designated as "an idle stroke" hereinafter). After the first control valve $V_1$ has opened the first valve openings 31a, air is supplied to the main system air-bleeding passage 18 through the air-inlet port 10a, filter 24, through holes 25a and 25b of the yoke 25, first valve openings 31a, first passage $P_1$ and first outlet port 10b. After the second control valve $V_2$ has opened the second valve openings 31b, air is supplied to the slow system air-bleeding passage 19 through the air-inlet port 10a, filter 24 through holes 25a and 25b of the yoke 25, a through hole 35b formed through the spring holder 35, second valve openings 31b and second outlet port 10c. The respective quantities of air which is supplied into the main system air-bleeding passage 18 and the slow system air-bleeding passage 19 are controlled corresponding to the respective opening areas of the first valve openings 31a and the second valve openings 31b, and hence corresponding to the intensity of the electric current which is supplied to the solenoid 33 of the linear motor 30.

The oxygen sensor, as generally known, is sensitive to the oxygen partial pressure in the exhaust gas. Such an oxygen sensor having a solid electrolyte, preferably made of zirconium oxide, has previously been proposed. It is known that the output of an oxygen sensor of this type changes suddenly in a very short response time when the air-fuel ratio of the air-fuel mixture supplied to an internal combustion engine is equivalent to a fixed value around the stoichiometric air-fuel ratio. Generally, the oxygen sensor does not provide any output signal while the air-fuel ratio of the air-fuel mixture being supplied to the engine is smaller than the fixed value (lean air mixture), whereas the oxygen sensor provides an output signal when the air-fuel ratio exceeds the fixed value. The electronic control unit 20 shown in FIG. 1 is adapted to increase the electric current of the output signal 20a gradually with the lapse of time whie the output signal 17a of the oxygen sensor 17 is applied to the electronic control unit 20 and to reduce the electric current of the output signal 20a gradually with the lapse of time while no output signal 17a of the oxygen sensor 17 is applied to the electronic control unit 20. Accordingly, when the output signal 17a of the oxygen sensor 17 is applied to the electronic control unit 20, the electronic control unit 20 applies an analog electric signal 20a, which increases with the lapse of time, to the solenoid 33 so that the bobbin 32 is caused to move by a distance proportional to the value of the signal. The movement of the bobbin 32, as described hereinbefore, results in an air supply to the main system air-bleeding passage 18 and the slow system air-bleeding passage 19.

The features of the apparatus for controlling the proportion of air and fuel in the air-fuel mixture of the internal combustion engine thus constituted in accordance with the present invention will be described hereinafter with reference to the aforementioned embodiment. The distance of the movement of the bobbin 32 is proportional to the intensity of electric current supplied to the solenoid 33 of the linear motor 30. The idle stroke of the bobbin 32 of the linear motor 30 from the closing position to the start of opening is l, which is common to the first control valve $V_1$ and the second control valve $V_2$. Accordingly, the control valves $V_1$ and $V_2$ start opening at a current intensity of Imin, then the air flow rate increases in proportion to the current intensity with the increase in the electric current and finally, an utmost flow rate Qmax is attained at a current intensity of Imax in which the valve openings 31a and 32a are fully opened. Therefore, the air supply control for the main system air-bleeding passage as well as for the slow system air-bleeding passage, hence the air-fuel ratio control of the carburetor, can be attained through the supply of an electric current corresponding to the opening degree of the first or the second control valve $V_1$ or $V_2$ capable of providing a required air-bleeding rate from the electronic control unit 20 to the solenoid 33 of the proportional control solenoid valve 10.

It will be well understood from what has been described hereinbefore that the apparatus for controlling the proportion of air and fuel in the air-fuel mixture in accordance with the present invention is capable of actuating two control valves with a control signal current for controlling a single proportional control solenoid valve of an intensity which is substantially the same with that of a current which is necessary for controlling a conventional proportional control solenoid valve having a single control valve, thus attaining the object of the present invention. Furthermore, the present invention provides also an advantage that the load on the power source for driving the electronic control unit can be reduced, since a reduced electric current is necessary. Still further, the use of a single proportional control solenoid valve integrally including two control valves simplifies the constitution of the apparatus for controlling the proportion of air and fuel in the air-fuel mixture.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. An apparatus for controlling the proportion of air and fuel in the air-fuel mixture of the internal combustion engine having an intake manifold, a main system fuel passage and a slow system fuel supply port, comprising:
   a carburetor including an air horn tube having a venturi tube with a main nozzle and a throttle valve and connected to the intake manifold of said internal combustion engine, a main system fuel tube opening into said main nozzle of said venturi tube at a first end thereof and communicating with said main system fuel passage through a second end thereof, a slow system fuel tube opening into said slow system fuel supply port which is adjacent to said throttle valve of the air horn tube at a first end thereof and communicating with a slow system fuel passage through a second end thereof:

a proportional control solenoid valve including a box-shaped housing formed of a magnetic material and provided with an air-inlet port, a first outlet port connected to said main system air-bleeding passage and a second outlet port connected to said slow system air-bleeding passage, a single iron core having a tubular periphery, supported by said housing at opposite ends thereof and provided with separately formed first and second passages communicating with said first outlet port and said second outlet port, respectively, at opposite ends thereof, at least one first valve opening formed in the shape of an oblong circle extending axially of said iron core in a portion of said iron core provided with said first passage to allow communication of said first passage with said air-inlet port, and second valve openings formed in the shape of an oblong circle extending axially of said iron core in a portion of said iron core provided with said second passage for allowing communication of said second outlet port with the air-inlet port, a single bobbin axially slidably mounted on the periphery of said iron core, a solenoid wound around the periphery of said bobbin in an axial portion thereof and having a first valve element and a second valve element for opening and closing said at least one first valve opening and said at least one second valve opening respectively, spring means urging said bobbin in one axial direction of said iron core and at least one pair of permanent magnets fixed to said housing at a position corresponding to said solenoid and so disposed that the flux of the magnetic force thereof passes perpendicular with respect to said solenoid; and control means for supplying analog electric signals to said solenoid of said proportional control solenoid valve whereby said bobbin of said proportional control solenoid valve moves axially along said iron core a distance proportional to a level of the analog electric signals applied to the solenoid by said control means and said first valve element and said second valve element open said at least one first valve opening and said at least one second valve opening, respectively, by respective areas corresponding to the level of said analog electric signals.

2. An apparatus according to claim 1, wherein said winding of said solenoid further comprises a terminal connected thereto and wherein said spring means further comprises first and second separate conductive compression coil springs each connected at a first end thereof to said terminal of the winding of said solenoid and said control means for supplying analog electric signals to said solenoid further comprises a plurality of lead wires each connected to a second end of a corresponding compression coil spring.

3. An apparatus according to claim 1, wherein said control means for suppling analog electric signals to said solenoid further comprises an oxygen sensor attached to the exhaust passage of said internal combustion engine and an electronic control unit for generating analog electric signals on the basis of output signals of said oxygen sensor.

* * * * *